Figure 1:
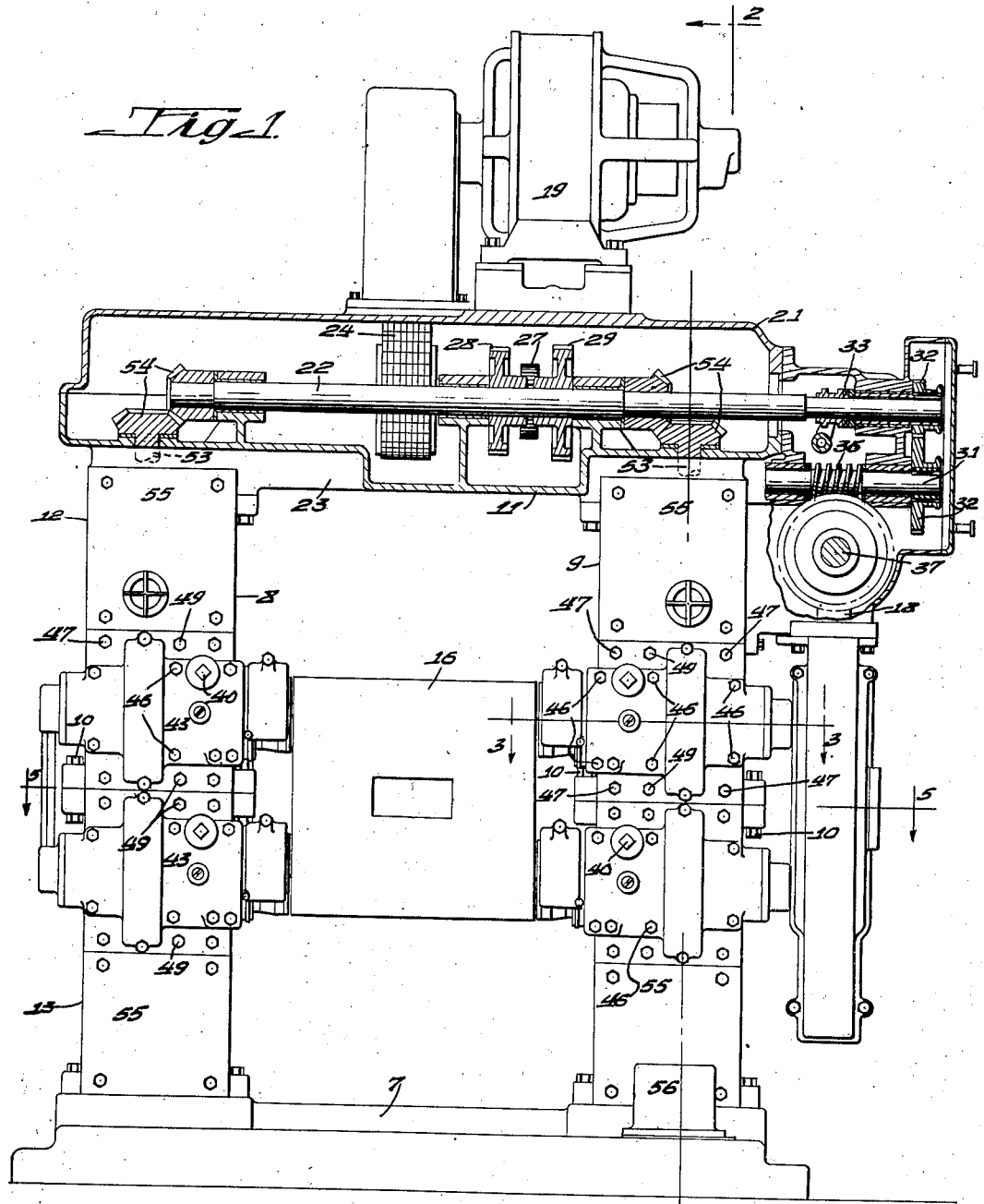

April 14, 1925.

J. R. JOHNSON 1,533,705

DRUM TYPE MILLING MACHINE

Original Filed Nov. 8, 1921   3 Sheets-Sheet 1

April 14, 1925.
J. R. JOHNSON
DRUM TYPE MILLING MACHINE
Original Filed Nov. 8, 1921
1,533,705
3 Sheets-Sheet 2
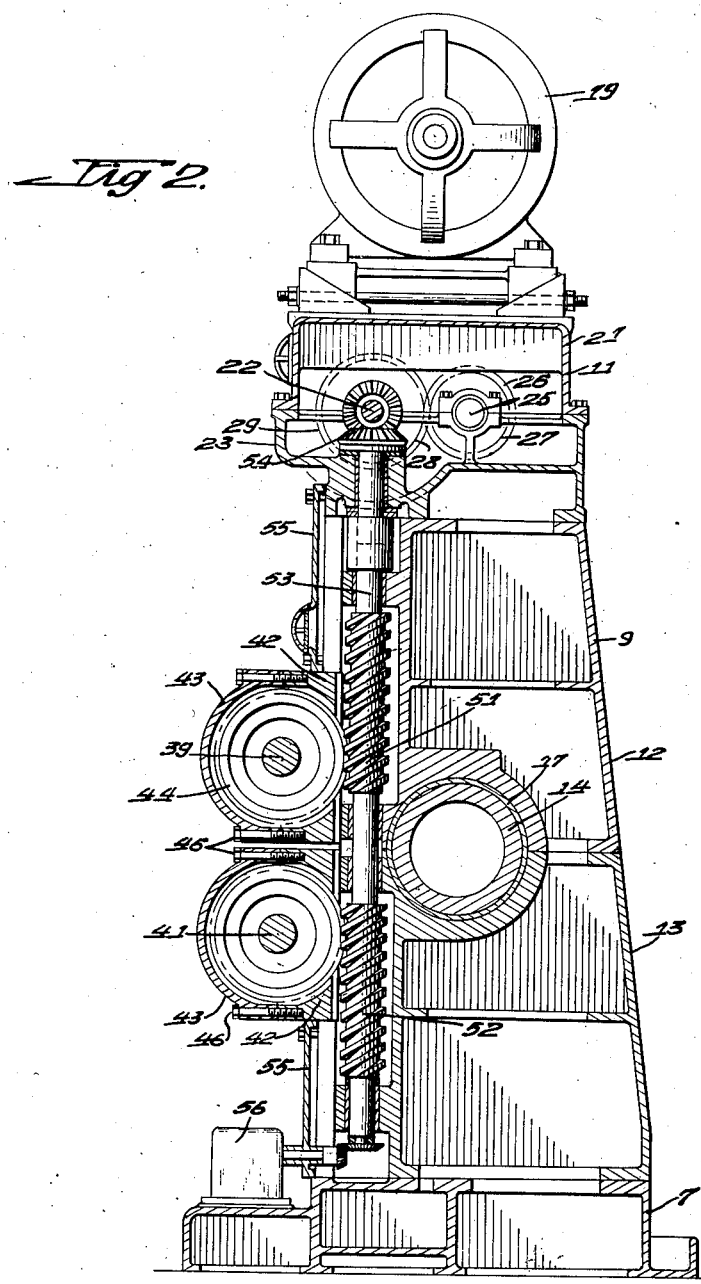

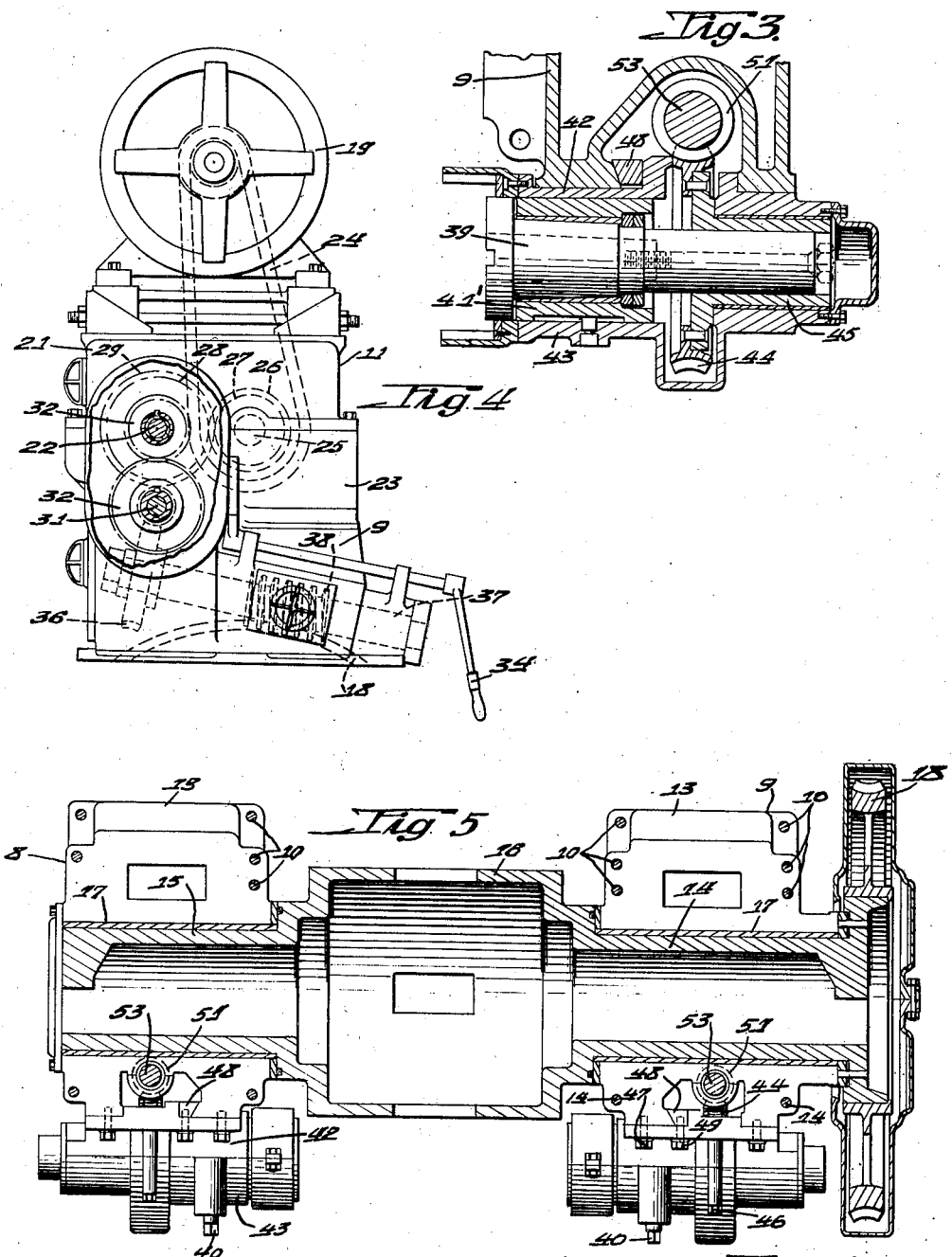

Patented Apr. 14, 1925.

1,533,705

UNITED STATES PATENT OFFICE.

JOHN R. JOHNSON, OF ROCKFORD, ILLINOIS, ASSIGNOR TO THE INGERSOLL MILLING MACHINE COMPANY, OF ROCKFORD, ILLINOIS, A CORPORATION OF ILLINOIS.

DRUM-TYPE MILLING MACHINE.

Application filed November 8, 1921, Serial No. 513,843. Renewed December 10, 1924.

*To all whom it may concern:*

Be it known that I, JOHN R. JOHNSON, a citizen of the United States, residing at Rockford, in the county of Winnebago and State of Illinois, have invented certain new and useful Improvements in Drum-Type Milling Machines, of which the following is a specification.

This invention relating in general to metal surfacing machines, has more particular reference to drum type milling machines, and is an improvement on the invention disclosed in my United States Letters Patent No. 1,414,812.

The primary object of the present invention is to provide a drum type metal surfacing machine of the character disclosed in said application, embodying such novel construction and arrangement of parts as to promote simplicity, compactness and rigidity.

These machines are characterized by upright laterally spaced side housings held in rigid relative relation and carrying a rotary work drum and cutter spindles, the latter of which are adapted for carrying cutters or tools for surfacing the work-pieces as they are carried in succession between the cutters by rotation of the drum. I have aimed to simplify the manufacture and to increase the strength of the side housings by forming them of upper and lower sections between which are interposed the bearings for the work drum. I have also aimed to provide a very rigid and substantial sectional frame upon which the work drum and spindle saddles are mounted, the several frame units being constructed and secured together in a novel manner.

Another object resides in the provision of spindle saddles adapted to be mounted in different vertical locations on the side housings to increase the capacity of the machine; and furthermore, to provide novel driving means in a machine of this character for driving the spindles in any location thereon.

Other objects pertaining to the construction and arrangement will be appreciated by those skilled in this art as the invention becomes better understood by reference to the following description when considered in connection with the accompanying drawings, in which—

Figure 1 is a front elevation, partly in section, of a drum type milling machine embodying my invention;

Fig. 2, a vertical section taken substantially on the line 2—2 of Fig. 1;

Fig. 3, a horizontal section through one of the cutter spindles taken substantially on the line 3—3 of Fig. 1;

Fig. 4, an end elevation, partly in section, of the upper portion of the machine looking at the right hand end of Fig. 1; and Fig. 5, a horizontal section taken substantially on the line 5—5 of Fig. 1.

Drum type metal surfacing machines of the type disclosed in said patent and my copending applications Serial Numbers 508,340 and 508,341 and in the present case have been developed to meet demands for continuous operations for producing accurate work rapidly and in large quantities. They have also been designed to occupy small floor space, to have such sturdiness and rigidity as to enable heavy milling or metal surfacing operations to a fine degree of accuracy and to afford other advantages in regard to loading and unloading of the work-pieces, and to the maintenance and operation of the machine.

In the present development of this type of machines, I employ roughing and finishing milling cutters which successively surface mill the work-pieces as they are carried past the cutters by the rotary drum, although it should be understood that other forms of surfacing tools might be employed, such, for example as grinding wheels, either entirely or in combination with milling cutters.

Referring more particularly to the drawings, it will be observed that I have provided a base 7, upon which is rigidly mounted in laterally spaced relation, a pair of upright side housings 8 and 9 joined at their upper ends by a top plate structure 11, these reference numerals being generally applied. These side housings form the supporting structure for a rotary work-carrying drum and the cutter spindles, also for the mechanism for driving the drum and spindles. Each side housing comprises an upper and a lower section 12 and 13 respectively, which are rigidly secured together by bolts 10. Said sections form hollow columns so designed as to possess great strength and rigidity. As a factor in this regard, I have journaled the ends 14 and 15 of the work drum 16 in bearings 17 located and supported substantially midway between the front and back of the respective side housings. That is, each upper and lower section is shaped to provide a semi-circular journal saddle for the reception of its bearing 17 and the upper sections have substantial seating area on the lower sections and are firmly bolted to the latter both at the front and rear of the drum bearing. This construction also simplifies the manufacture as it enables building the side housings in two units.

The work-carrying drum may be of any suitable or preferred construction, and in the present instance consists of a cylindrical body 16 supported by integral trunnions 14 and 15 journaled in the side housings as described. Upon this drum work fixtures of various kinds may be mounted for carrying the work-pieces in circumferentially spaced relation. The periphery of the drum may be any of various shapes and the work drum itself may be constructed for carrying the work-pieces. In other words, in this type of machines the rotary work-carrying element, such for example as the drum 16, may be removed as an entirety and substituted by a new drum for carrying different work-pieces, or if desired, work fixtures may be provided for interchangeable mounting on the rotary element corresponding in this case to the drum 16.

Mechanism is provided for driving the drum without torsion or deflection, consisting of a relatively large diameter worm gear 18 fixed to the trunnion end 14 of the drum and driven through a train of reduction gearing carried and housed in part by the top plate structure. Any suitable mechanism may, however, be provided for revolving the drum. This comprises in the present example, a motor 19 mounted on the cover 21 of the top plate structure and adapted to drive a horizontal shaft 22 suitably journaled in bearings carried by the lower part 23 of said top plate structure. A driving connection between the motor and shaft 22 comprises a silent link chain 24 which drives an intermediate shaft 25 on which is axially shiftable a pair of connected spur gears 26 and 27, the former of which is shown in mesh with a spur gear 28 fixed to the shaft 22 and the latter of which is adapted by shifting said pair of gears to mesh with a spur gear 29 fixed to said shaft 22. This provides a simple form of change-speed gearing. The shaft 22 drives an intermediate worm shaft 31 through the agency of pick-off or change-speed gears 32 and a suitable clutch 33 adapted to be engaged and disengaged by operation of the lever 34 at the rear of the machine. The worm screw 35 on the shaft 31 meshes with the worm gear 36 fixed to a worm shaft 37 which carries a worm screw 38 meshing with the worm gear 18 on the work drum. It will be manifest that with the motor running and the clutch 33 engaged, the drum 16 will be so revolved through such a system of reduction gearing and power-increasing leverages as to insure a very powerful feed. Thus under heavy duty work the work drum will be driven without torsion or deflection and without chattering.

My invention also contemplates the mounting of cutter spindles in a novel manner on the side housings, primarily with the view to increasing capacity of the machine for different work. To this end, one or more cutter spindles may be mounted on each side housing with capacity for adjustment thereon to change the cutting radius to accommodate different jobs. In the present example, I mount a roughing and a finishing cutter spindle 39 and 41 respectively, on each side housing. The mounting for each spindle is similar, hence a description of one will suffice, although it will be understood that my invention is in no way limited either to the particular spindle construction or mounting shown in this case merely for purpose of illustration. The spindle 39 is revolubly mounted in a quill 41', which is axially adjustable in a saddle composed of an inner and an outer section designated generally by 42 and 43 respectively. Suitable means, such as the usual pinion and rack (not shown) may be employed for feeding the spindle axially, the pinion being rotated by means of the square ended shaft 40, Fig. 1. The spindle is adapted to be rotated by means of a worm gear 44, the hub 45 of which is splined on the spindle and journaled in the saddle. The outer half section 43 is secured by bolts 46 to the inner section of the saddle and said inner section is secured by bolts 47 to the face of the side housings. A gib 48 interposed between the side housings and the inner section 42 of the saddle is adapted to be drawn tight by bolts 49 for promoting greater rigidity in the mounting of the saddle upon the housing. The worm gears 44 in the saddles on each side housing mesh with worm screws 51 and 52 fixed to a vertical shaft 53 suitably journaled in the adjacent side housing. Each vertical spindle-driving shaft 53 is in driving connection at its upper end with the horizontal driving shaft 22 through the agency of bevel gears 54.

My invention contemplates positioning the spindle saddles at different elevations on their respective housings, to increase the capacity of the machine by increasing and diminishing the cutting radius. To this end, the saddles may be bolted at different elevations on their respective housings, and in any such adjusted position the spindle driving worms will mesh with the worm screws 51 and 52, which it will be observed are elongated for this purpose. In the present example, I prefer to leave the front of the housing open and to employ face plates 55 for closing the open space above and below the saddles. As shown in the present machine, the spindle saddles on each housing are positioned close together; and to raise or lower the spindle saddles, it is necessary to remove the face plates 55 and the saddles and then bolt the saddles to the housing in the new adjusted position. Any open space above or below the saddles will be covered by face plates similar to the plates 55 but of the proper size for such open space or spaces. In the event that the machine is designed for a special purpose and will never be used for any other than a single job, it is not necessary to employ removable vork plate 55 or adjustable saddles, and in such case only the outer section of the respective saddles need be removable. However, in order to increase the capacity of the machine as is frequently desired, the adjustable saddles and face plates are employed.

The operation is as follows. Assuming that the upper spindles are equipped with roughing cutters and the lower spindles with finishing cutters and the work drum with a suitable fixture for carrying the work-pieces in circumferentially spaced relation, the drum will be revolved slowly in a counter-clockwise direction, viewing Fig. 2, and the cutters will be revolved in a clockwise direction. One or more operators, as the case may require, stand at the rear of the machine, that is, at the side opposite from the cutters and load the castings, forgings or other work-pieces onto the continuously revolving work drum. The work-pieces will be carried in succession between the roughing and finishing cutters, thereby surfacing the ends of the work-pieces or one face thereof, according to the arrangement of the work-pieces on the drum. The finished work-pieces will be carried upwardly at the rear of the machine and are removed by the operator. It will be manifest that a machine of this character is particularly designed for production operation, that is, for continuous service in the surfacing of large quantities of work-pieces. The construction permits of convenient inspection of the cutters and driving parts from the front of the machine by the inspectors, tool men or others. The construction also enables complete housing of all of the driving parts and the use of a cascade feed oiling system for such parts. That is, the top plate structure is so designed that it constitutes both an oil reservoir and a casing for the driving mechanism and gearing, and the side housings are so shaped as to permit of oil feed from said reservoir down along the line of the shafts 53 and the cutter spindles, and finally drain into the base from which the oil is elevated by a pump 56 to the reservoir in the top. Such a system of oiling is disclosed and claimed in my co-pending application, Serial No. 508,341. It will be observed that considering the heavy continuous duty of the work, the driving parts are few and very compactly arranged with the view not only to reducing the cost of manufacture of machines of this type but also to securing the greatest efficiency and to eliminating torsion and deflection between the source of power and the ultimate application thereof.

It is believed that the foregoing conveys a clear understanding of the objects prefaced above, and while I have illustrated but a single working embodiment, it should be understood that considerable change might be made in the construction and arrangement without departing from the spirit and scope of the invention as expressed in the appended claims:

I claim:

1. In a milling machine, in combination, a housing having a front opening; a spindle-driving worm in the housing in registration with said opening; a spindle unit comprising a tool spindle, a saddle in which the spindle is mounted for rotation, and a worm gear concentric and in driving connection with the spindle; and means for removably securing the spindle unit on the front of the housing in which position the spindle worm gear extends through said opening and meshes with the spindle-driving worm and from which position the spindle unit is removable independently of the worm.

2. A drum type milling machine comprising, in combination, a frame structure including laterally spaced upright housings, work-carrying drum interposed between and supported on the housings, a vertical spindle-driving shaft in one of the housings having a worm above and another below the drum axis, an upper and a lower spindle carrying saddle removably mounted on the front of said housing, each spindle having a worm gear adapted to be brought into and out of mesh with the adjacent spindle-driving worm upon mounting and removing its respective spindle saddle from operative position on the housing.

3. A drum type milling machine as set forth in claim 2, in which each saddle comprises an inner and an outer section between which the spindle is supported, the inner section being removably secured to the housing and the outer section being removably secured to the inner section and permitting removal of the spindle from said inner section.

4. A drum type milling machine comprising, in combination, a frame structure including laterally spaced upright housings; a work-carrying drum interposed between and mounted on the housings; a spindle unit including a tool spindle, a saddle in which the spindle is mounted for rotation, and a spindle-driving gear; a driving train within one of the housings terminating in a spindle-driving pinion located adjacent to the front of the housing, said housing having an opening through its front in registration with said pinion; and means for securing said spindle unit in position on the front of said housing with its spindle-driving gear extending through said opening and in mesh with said pinion whereby said spindle unit may be mounted and removed without disturbing said spindle-driving train.

5. A drum type milling machine as set forth in claim 4, in which the spindle driving pinion is in the form of an elongated vertically disposed worm and in which the spindle unit is adapted to be mounted on the housing at different vertically spaced positions in any of which its spindle driving gear is adapted to mesh with said pinion.

6. A drum type milling machine as set forth in claim 4, in which the front opening in the housing is vertically elongated and in which the spindle unit is adapted to be mounted on the housing at different vertically spaced positions in any of which it is adapted to have driving connection with the spindle driving pinion.

7. In a drum type milling machine, upright laterally spaced side housings, each having an open front, a rotary work drum interposed between and mounted on the side housings, spindle saddles removably mounted on the front of each housing, removable face plates covering the remaining open space on the front of the side housings, and means within the side housings for driving the spindles, the spindle saddles adapted to be located at different elevations on the side housings and the open front thereof adapted to be covered by face plates.

8. In a drum type milling machine of the character described, the combination of spaced upright side housings, a work drum interposed between and revolubly mounted on the side housings, a spindle saddle removably mounted on the front of each side housing and carrying a spindle-connected gear, and mechanism for driving the drum and each spindle-connected gear including a spindle-driving gear within each housing and with which each spindle-connected gear is adapted to be brought into and out of mesh by mounting the spindle saddle upon and removing it from its respective side housing.

9. A drum type milling machine comprising, in combination, a frame structure including spaced upright housings, a rotary work-carrying drum interposed between and journaled at its end on the housings, each housing comprising an upper and lower section divided horizontally through the drum journal and rigidly clamped together in operative relation, each section having a semi-circular bearing saddle for reception of the drum bearing, a vertical spindle-driving shaft in one of the housings in front of the drum journal mounted in bearings in the upper and lower housing sections, a spindle driving pinion on said shaft above and another below the drum journal, each section of said housing being open in front of its pinion, and a tool spindle removably mounted on the front of each of said housing sections and having a spindle-driving gear adapted to extend through the front opening therein and to be brought into and out of mesh with the spindle-driving pinion therein upon being moved into and out of operative position on the front of the housing.

JOHN R. JOHNSON.